(12) United States Patent
Schreter (10) Patent No.: US 10,180,812 B2
(45) Date of Patent: Jan. 15, 2019

(54) CONSENSUS PROTOCOL ENHANCEMENTS FOR SUPPORTING FLEXIBLE DURABILITY OPTIONS (71) Applicant: SAP SE, Walldorf (DE)

(72) Inventor: Ivan Schreter, Malsch (DE)

(73) Assignee: SAP SE, Waldorf (DE)

( * ) Notice: Subject to any disclaimer, the term of this patent is extended or adjusted under 35 U.S.C. 154(b) by 165 days.

(21) Appl. No.: 15/184,054

(22) Filed: Jun. 16, 2016

(65) Prior Publication Data

US 2017/0364273 A1 Dec. 21, 2017

(51) Int. Cl.
G06F 3/06 (2006.01)
G06F 17/30 (2006.01)

(52) U.S. Cl.
CPC .............. G06F 3/067 (2013.01); G06F 3/065 (2013.01); G06F 3/0617 (2013.01); G06F 3/0619 (2013.01); G06F 17/30575 (2013.01)

(58) Field of Classification Search
CPC ...... G06F 17/30194–17/30215; G06F 3/0617; G06F 3/0619; G06F 3/065; G06F 3/067–3/0689; G06F 17/30575–17/30581
See application file for complete search history.

(56) References Cited

U.S. PATENT DOCUMENTS

| 9,092,475 | B2 | 7/2015 | Schreter | |
|---|---|---|---|---|
| 9,183,245 | B2 | 11/2015 | Schreter | |
| 2009/0271412 | A1* | 10/2009 | Lacapra | G06F 17/30206 |
| 2013/0018928 | A1 | 1/2013 | Lacapra et al. | |
| 2013/0117234 | A1* | 5/2013 | Schreter | G06F 17/30368 707/674 |
| 2015/0058098 | A1 | 2/2015 | Pope et al. | |
| 2015/0278243 | A1* | 10/2015 | Vincent | G06F 17/30194 707/634 |

* cited by examiner

Primary Examiner — Nicholas J Simonetti
(74) Attorney, Agent, or Firm — Mintz Levin Cohn Ferris Glovsky and Popeo, P.C.

(57) ABSTRACT

A cluster of nodes can receive a request to perform a logging operation of a distributed data storage application. The logging operation can include writing of data to a secondary storage of each of the nodes of the plurality of nodes. The request can include an indication of a durability mode to use for the logging operation. The logging operation can be initiated at each node of the plurality of nodes according to the indication of the durability mode, a completion callback can be run at each node of the plurality of nodes according to the indication of the durability mode, a global durability state and a global commit state can be determined for the cluster, and a reply can be returned to the request once the global durability state and global commit state are consistent with the indication of the durability mode to be used for the logging operation.

20 Claims, 6 Drawing Sheets

```
function log(data, mode, callback):
    increment current log index
    log[index] = data
    if mode == immediate:
        flush_callback[index] = callback
    else
        flush_callback[index] = <none>
    if mode == replicated_delayed || mode == replicated_relaxed
        replicate_callback[index] = callback
    else
        replicate_callback[index] = <none>
    if mode == immediate || mode == delayed || mode == replicated_delayed:
        flush_index = index
        flush local log
        reset timeout
    end if
    update state of node with id == leader_id with new match_index = index
    send replicate messages to all replicas (same as in pure RAFT with additional
    global_durable_index and flush_index)
    if mode == delayed || mode == relaxed:
        call callback
    end if
```

```
function local_log_flush_finished(index):
    update state of node with id == leader_id with new local_durable_index
    call check_durability
```

```
function replicate_ack(replica_id, match_index, local_durable_index):
    update state of node with id == replica_id with new match_index and
    local_durable_index
    compute new commit_index by picking median element of a match_index of all nodes
    for each index in range (old commit_index, new commit_index]:
        if replicate_callback[index] != <none>:
            call replicate_callback[index];
        end if
    end for each
    call check_durability
```

```
function check_durability:
    compute new global_durable_index by picking median element of a
    local_durable_index of all nodes
    for each index in range (old global_durable_index, new global_durable_index]:
        if flush_callback[index] != <none>:
            call flush_callback[index];
        end if
    end for each
```

```
function timeout:
    flush local log
    reset timeout
```

CONSENSUS PROTOCOL ENHANCEMENTS FOR SUPPORTING FLEXIBLE DURABILITY OPTIONS

TECHNICAL FIELD

The subject matter described herein relates to data storage, and in particular to durability options for writing data to secondary (e.g. persistent) storage in a cluster of computing systems (e.g. nodes).

BACKGROUND

Consensus protocols ensure that data replicated across several nodes of a cluster of nodes remain in a consistent state and are widely used in distributed computing systems to achieve failure tolerance in clusters of computers. Each computing node in the cluster runs its own copy of a state machine. Consensus involves multiple nodes (e.g. servers, computing systems, data stores, etc.) being in agreement on data values. Once a consensus is reached, that decision is final. Each node in a cluster can include a computing system with one or more programmable processors implementing a state machine and a log. Consensus is typically reached when a quorum (e.g. a majority, a plurality, or some other definition etc.) of the nodes in the cluster decides to accept the new state of the system (e.g., adding new data to a database table, setting a value for a key in key value stores, accepting a message in messaging systems, etc.). The state of the state machine presented by the cluster is based on the consensus such that clients interacting with the cluster perceive them as a single state machine having a consistent state. A consensus algorithm can ensure that if any of the state machines in a cluster applies a particular command at a particular point in a series of commands, none of the other state machines in the cluster will apply a different command at that same point in the series of commands. Well-known examples of consensus protocols include Paxos and RAFT.

SUMMARY

Aspects of the current subject matter can provide the ability to offer flexible durability options for write operations from data buffers to persistent/secondary storage in data stores.

In one aspect, a cluster of nodes implementing a distributed data storage application receiving a request to perform a logging operation of the distributed data storage application. The logging operation includes writing of data to a secondary storage of each of the nodes of the plurality of nodes. The request includes an indication of a durability mode to use for the logging operation. The method further includes initiating the logging operation at each node of the plurality of nodes according to the indication of the durability mode, running a completion callback at each node of the plurality of nodes according to the indication of the durability mode, determining a global durability state and a global commit state for the cluster, and returning a reply to the request once the global durability state and the global commit state are consistent with the indication of the durability mode to be used for the logging operation.

When the indication is for an immediate durability mode, the initiating can include each node of the plurality of nodes immediately writing a log buffer containing data to the secondary storage of that node and running the completion callback as soon as the writing is completed, and the returning of the reply can include waiting until the global durability index and the global commit index reflect that a quorum of the nodes have replied run the completion callback. When the indication is for a replicated delayed durability mode, the initiating can include each node of the plurality of nodes immediately writing a log buffer containing data to the secondary storage of that node, and running the completion callback as soon as data are written to a log buffer but not yet to a secondary storage of that node, and the returning of the reply can include waiting until the global durability index and the global commit index reflect that a quorum of the nodes have written to the log buffer. When the indication is for a replicated relaxed durability mode, the initiating can include each node of the plurality of nodes not immediately writing a log buffer containing data to the secondary storage and running the completion callback immediately, and the returning of the reply can include waiting until the global durability index and the global commit index reflect that a quorum of the nodes have written to the log buffer. When the indication is for a delayed durability mode, the initiating can include each node of the plurality of nodes immediately writing a log buffer containing data to the secondary storage of that node, and running the completion callback as soon as data are written to a log buffer but not yet to a secondary storage of that node, and the returning of the reply can include waiting until the data is written to a log buffer on the leader node only. When the indication is for a relaxed durability mode, the initiating can include each node of the plurality of nodes not immediately writing a log buffer containing data to the secondary storage and running the completion callback immediately, and the returning of the reply can include waiting until the data is written to a log buffer on the leader node only.

In some variations one or more of the following features can optionally be included in any feasible combination. The request further can include a destination of the data to be logged and a type of callback requested. The determining of the global durability state can include establishing a consensus among the nodes in the cluster regarding whether a quorum of the nodes in the cluster have achieved a durability state specified in the indication of the durability mode.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter generally relates to consensus protocols which build a log of operations on a state machine. The log of operations is generally synchronized across a set of nodes in the cluster using a consensus protocol such as the RAFT consensus protocol. Typically, one node is elected as a leader node (or "leader"), while the remaining nodes are follower nodes (or "followers"). All of the nodes, including the leader can be referred to as replicas. A consensus protocol decides which log entries are "committed," in other words, accepted by quorum of nodes.

Figure 1:
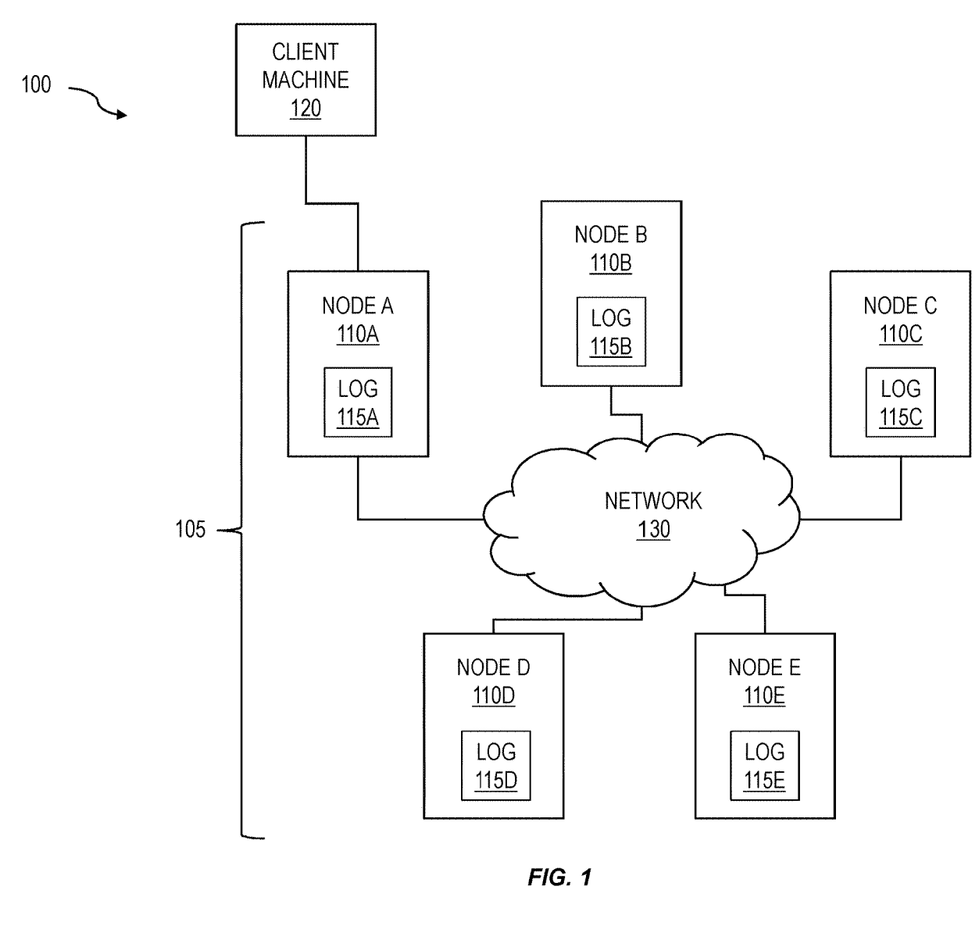
FIG. 1 shows a diagram illustrating features of a distributed computing system.

FIG. 1 shows a diagram of a system architecture 100 in which a consensus protocol is used in a cluster 105 of computing systems (e.g. nodes) to ensure that the nodes of the cluster (each of which implements a state machine of a data storage application) are kept in a consistent state based on a consensus among the nodes. The cluster 105 shown in FIG. 1 includes a first node 110A, a second node 110B, a third node 110C, a fourth node 110D, and a fifth node 110E. Each node 110A, 110B, 110C, 110D, 110E includes a respective write log 115A, 115B, 115C, 115D, 115E. The cluster 105 can interact with one or more client machine(s) 120, for example over a network communication pathway 130 to receive and respond to requests, such as for example nodes exchange messages regarding new data values, updates to data values, deletion of values, etc. (which are generally referred to herein as data updates).

A data update in an example (e.g. as illustrated in the system architecture 200 shown in FIG. 2) in which one or more client machines 120 communicates with a data storage application 204 executing on a single node (e.g. computing system 202) does not involve any consensus issues—the data value being updated by interaction between a client machine 120 and the data storage application 204 executing on the single node 110 is whatever it is per the state of the single node. In a distributed approach such as that illustrated in FIG. 1, however, all of the nodes 110A, 110B, 110C, 110D, 110E may not always be in perfect agreement regarding the state of the data value being updated. A consensus protocol such as those discussed above is typically used in distributed data storage applications.

Figure 2:
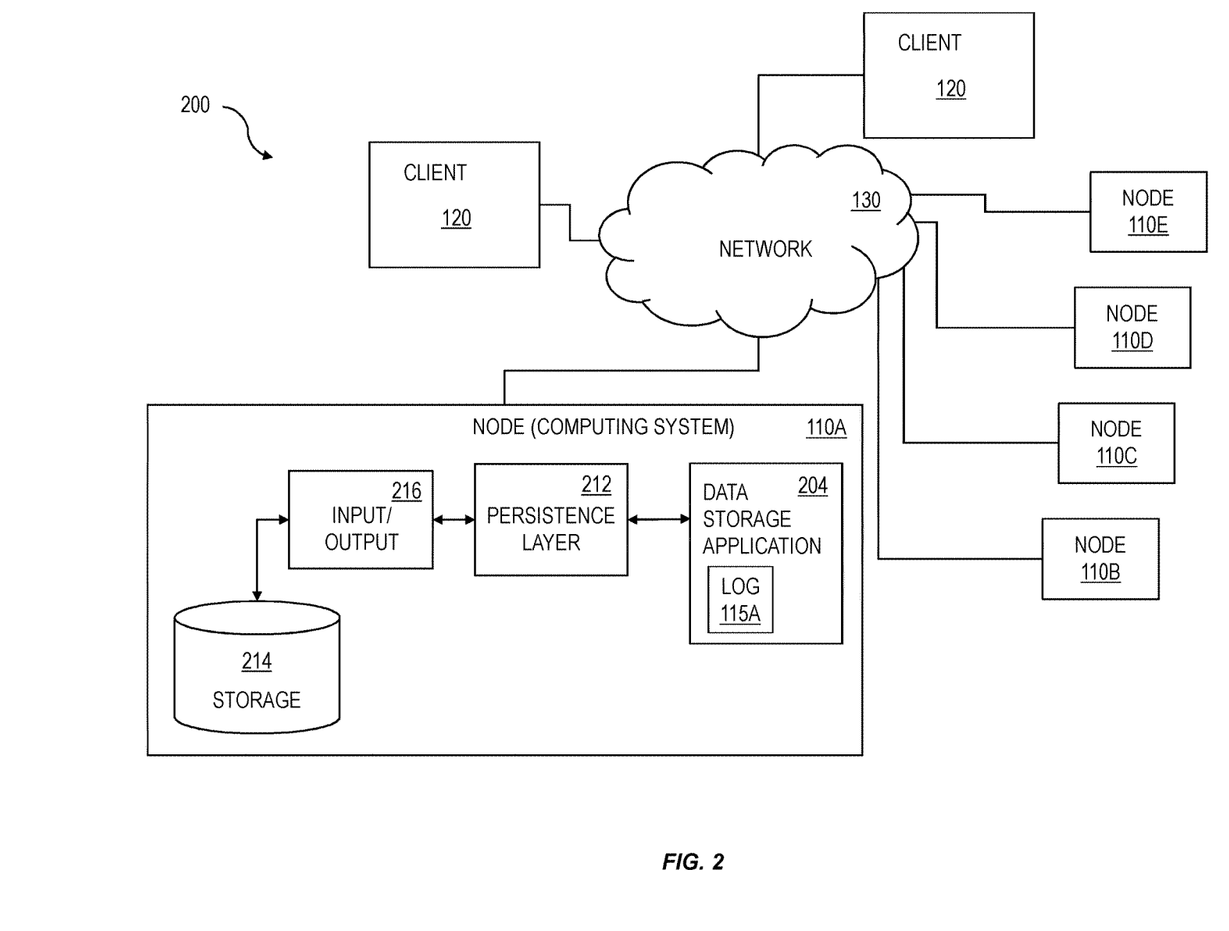
FIG. 2 shows a diagram illustrating aspects of a computing system arrangement having one or more features consistent with implementations of the current subject matter.

Further with reference to FIG. 2, the computing system 110A is representative of any of the nodes 110A, 110B, 110C, 110D, 110E shown in FIG. 1. The computing system 110A can include one or more programmable processors that can be collocated, linked over one or more networks, etc., and can execute one or more modules, software components, or the like of the data storage application 204. The data storage application 204 can include one or more of a database, an enterprise resource program, a distributed storage system (e.g. NetApp Filer available from NetApp of Sunnyvale, Calif.), or the like. In some examples, the data storage application can support one or more multi-tenancy features, data security/encryption, cloud infrastructure features, and/or other enterprise-level capabilities.

The one or more modules, software components, or the like can be accessible to local users of the computing system 110A as well as to remote users accessing the computing system 110A from one or more client machines 120 over a network connection 130. One or more user interface screens produced by the one or more first modules can be displayed to a user, either via a local display or via a display associated with one of the client machines 120. Data units of the data storage application 204 can be transiently stored in a persistence layer 212 (e.g. a page buffer or other type of temporary persistency layer), which can write the data, in the form of storage pages, to one or more secondary (e.g. persistent) storages 214, for example via an input/output (I/O) subsystem 216. The one or more secondary storages 214 can include one or more physical storage media or devices (e.g. hard disk drives, persistent flash memory, random access memory, optical media, magnetic media, and the like) configured for writing data for longer term storage. It should be noted that the secondary storage 214 and the input/output subsystem 216 can be external to the computing system 110A despite their being shown as included within the computing system 110A in FIG. 2.

Data retained at the secondary storage 214 of a node 110A can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

While it will be understood that the current subject matter may operate with other consensus protocols, various features are described herein in relation to the RAFT protocol. In establishing consensus between multiple nodes in a cluster (e.g. a cluster 100 such as that shown in FIG. 1) the RAFT protocol general involves transmission of a "match index" from follower nodes 110B, 110C, 110D, 110E to a leader node 110A to inform the leader node 110A what is the last common log entry index in the local log 115B, 115C, 115D, 115E of each follower node 110B, 110C, 110D, 110E and the log 115A of the leader node 110A. The RAFT protocol further includes transmission of a "commit index" from the current leader 110A to all of the follower nodes 110B, 110C, 110D, 110E to inform the follower nodes what is the globally agreed index of the last fully-replicated log entry.

Further to the above summary, the RAFT protocol classifies each node in a cluster 100 as being in one of a follower state, a candidate state, or a leader state. All nodes in a cluster other than the leader node have the follower state. However, when a current follower node fails to hear from a leader within some period of time, the follower can become a candidate and request votes from other nodes in the cluster as part of a leader election process. The candidate node becomes the leader 110A if it receives a majority of the votes from the nodes in the cluster 100. In an existing approach, data updates go through the cluster's leader 110A, and each such data update is added as an initially uncommitted entry in the log 115A of the leader node 110A. In other words, when the cluster 100 receives a data update, the data value being updated is generally not immediately updated at the leader node 110A. Committing the data update requires that the leader node 110A replicates the data update to the other nodes in the cluster 100 and then waits until a majority of the nodes confirm that they have written the data update. Upon receiving this confirmation from the majority, the leader node 110A then notifies the follower nodes 110B, 110C, 110D, 110E that the data update is committed.

Currently available consensus protocols, such as for example RAFT summarized above, generally do not take durability of changes into account. Rather, such approaches typically focus only on synchronizing the underlying state machines across nodes in the cluster 100. Durability guarantees need to be given by the state machine itself (which typically responds after data has been committed to a secondary storage 214 in order to guarantee cluster recovery in case of failures). However, for optimizing application performance on top of distributed data stores, it can be advantageous to allow a durability mode to be specified for each operation. Co-owned and co-pending U.S. patent application Ser. No. 15/183,648, the disclosure of which is incorporated herein by reference, includes a description of a flexible durability approach for implementation on a local system with a write-ahead log. The current subject matter includes features capable of extending such an approach to a distributed system. This approach can greatly improve throughput for some workloads by adding flexible durability options to a distributed system.

To support flexible durability options for a distributed data storage application, it is insufficient to pass single index information between a leader node and follower nodes in the cluster. Implementations of the current subject matter can extend currently available consensus protocols (e.g. RAFT) to communicate the following information. Follower nodes transmit a "match index" to the leader node to inform the leader node about already-replicated log entries. A conventional implementation of RAFT and other possible consensus approaches generally includes passing of this information, and it also occurs in implementations of the current subject matter. Consistent with the currently described approach, a "local durable index" is also passed from follower nodes to the leader node to inform the leader node about log entries persisted to secondary storage. The current subject matter further includes the leader node passing (to each follower node) a "commit index" to inform follower nodes about a newest agreed-to log entry (this also occurs in a conventional RAFT approach), a "global durable index" to inform follower nodes about a newest index which was persisted in a quorum of the follower nodes, and a "flush index" of a last log entry requesting durable storage.

It should be noted that messages exchanged between the leader node and follower nodes generally contain further information (e.g. the current leader node's term, etc.). These are omitted for brevity (since they remain unchanged from an existing RAFT-based approach) and can be found in a description of the RAFT protocol.

The aforementioned information about log state is sufficient to implement a flexible durability of operations approach (e.g. as described in co-owned and co-pending U.S. patent application Ser. No. 15/183,648 filed on Jun. 15, 2016) on a distributed system that applies a consensus protocol. In addition to the features described therein (e.g. a delayed durability option and a relaxed durability option), which are extended herein for use in a distributed data storage application, two additional durability options are defined with regard to the current subject matter: a "replicated_delayed" option and a "replicated_relaxed" option. These options can have similar semantics as delayed and relaxed with respect to durability, but the operation is only considered to be executed after the log entry has been replicated to the follower nodes.

FIGS. 3A, 3B, 4A, 4B, and 4C show examples 300, 325, 400, 425, 450 of simplified pseudo-code for logging with flexible durability, which can be executed on a leader node of a cluster. As shown in the pseudo-code 300 of FIG. 3A, and consistent with implementations of the current subject matter, a callback passed to a log( ) function is called when durability guarantees for a given mode are fulfilled. The pseudo-code 300 in FIG. 3A includes an additional argument for a typical logging function. In addition to designating the data to be logged and the type of callback, the log( ) function also takes a "mode" argument via which the durability mode for the logging can be specified. In other words, a logging command can include three arguments: source data to be logged, a type of callback requested, and a durability mode for the logging operation.

For a logging request that designates an "immediate" durability mode, a callback is added to the callback list of the current buffer flush for each node, and the buffer is flushed immediately. In other words, the log buffer at each node containing data is immediately written to the secondary (e.g. persistent) storage. When the input/output finishes at a given node, the node will run the respective callback to inform the leader node that the data update has been durably persisted. For a request that includes a "replicated delayed" or a "replicated relaxed" durability argument, the callback is run by a node as soon as the data is written to the buffer at the follower node, but not yet to secondary storage. However, the write to secondary storage is immediately initiated. Since the callback was already run, when the I/O finishes, no other operation occurs. For a logging request that includes a "replicated relaxed" durability argument, the callback is run immediately, but no input/output is triggered at any node. In other words, the nodes can collect further log entries into the current log buffer to write them together when either input/output is requested by another entry with immediate or delayed durability requirement or when a timeout expires.

For a delayed durability mode, each node of the plurality of nodes immediately writes a log buffer containing data to the secondary storage of that node. The completion callback is run as soon as data are written to the log buffer but not yet to the secondary storage of that node, and the returning of the reply involves waiting only until the data are written to the log buffer on a leader node of the plurality of nodes.

For a relaxed durability mode, each node of the plurality of nodes does not immediately write a log buffer containing data to the secondary storage of that node but does run the completion callback immediately. The returning of the reply involves waiting until the data is written to a log buffer on the leader node only.

The current subject matter also includes features relating to the cluster achieving consensus regarding an outcome of the requested logging operation.

Figure 3A:
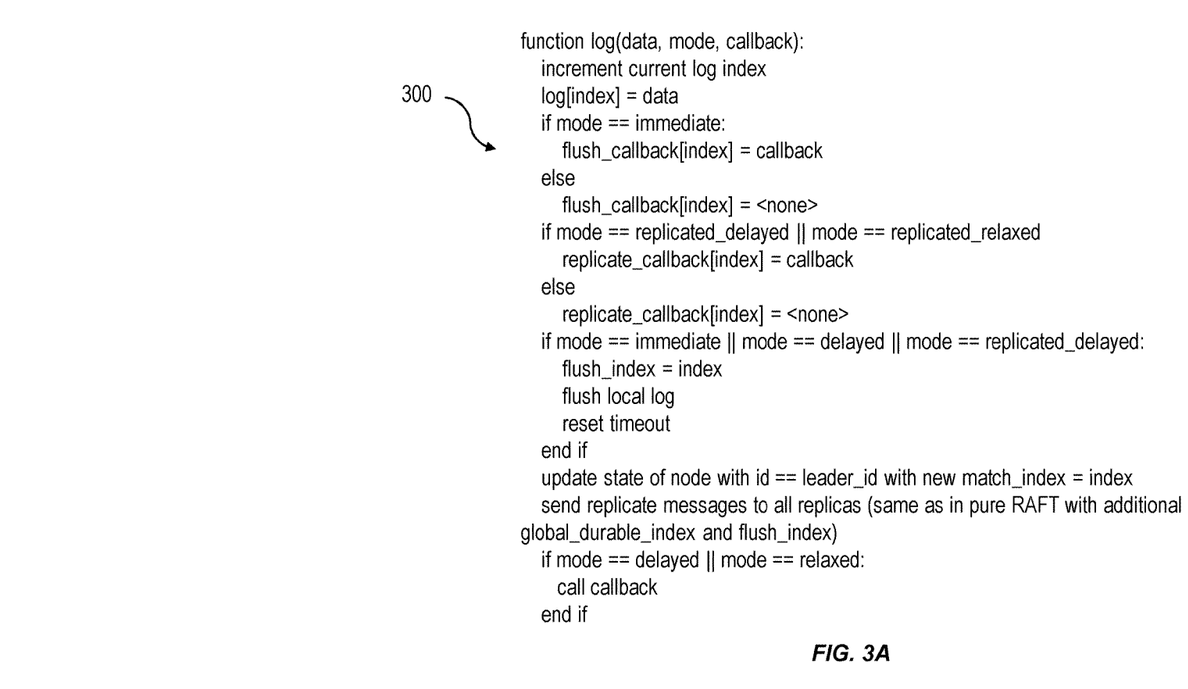
FIG. 3A and FIG. 3B show examples of pseudo-code illustrating features that can be included in implementations of the current subject matter.
Figure 3B:
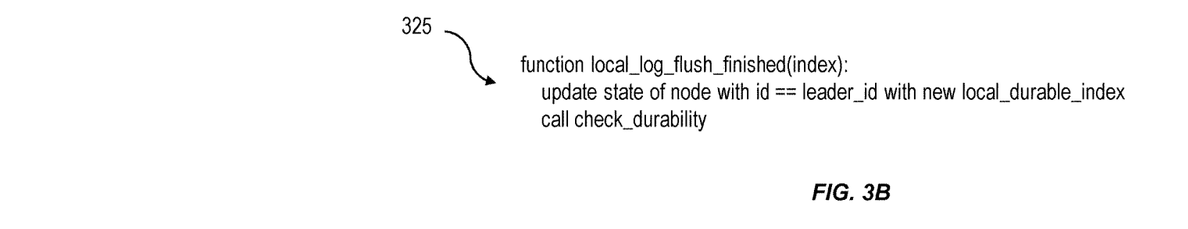
Figure 4A:
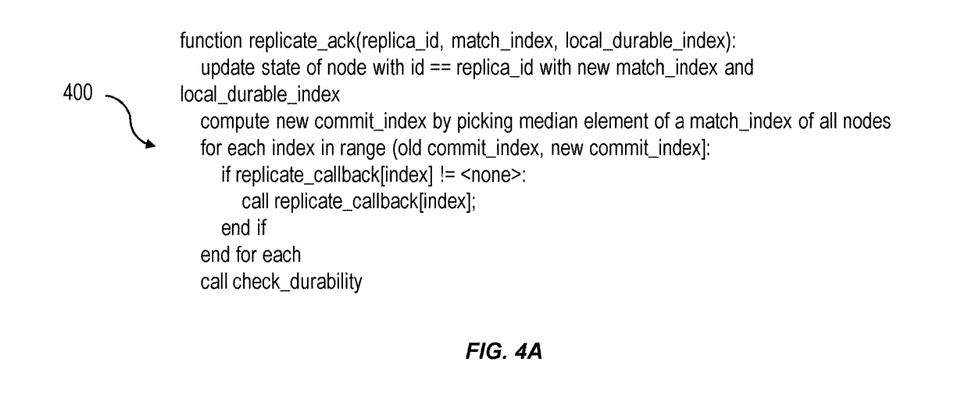
FIG. 4A, FIG. 4B, and FIG. 4C show additional examples of pseudo-code illustrating features that can be included in implementations of the current subject matter.
Figure 4B:
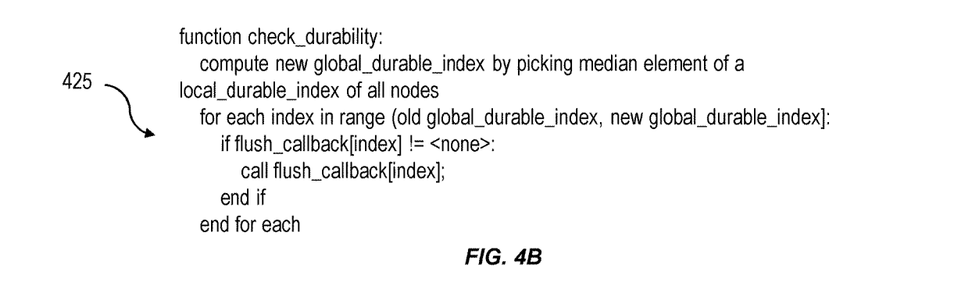

The pseudo-code 325 of FIG. 3B specifies operations to handle completion of input/output for the buffer flush. The pseudo-code 400 of FIG. 4A illustrates use of a local durable index on each node and further illustrates computing a commit index. The commit index reflects whether a quorum of the nodes in the cluster have accepted the logging operation specified in a request. The pseudo-code 425 of FIG. 4B relates to durability checking by computing a global durability index. The computing of the global durability index includes establishing a consensus among the nodes in the cluster 105, for example by determining that a quorum of the nodes in the cluster have achieved a durability state specified in the durability model indication provided with the request. According to some consensus algorithms, a quorum is determined by picking a median element of the respective indices (match_index, local_durable_index) of all nodes of the cluster. Picking of the median element as shown in FIG. 4A and FIG. 4B can occur via a sorting approach and/or by other approaches. The use of the median as shown in these figures is part of the determining of the quorum, which is part of many consensus protocols. However, it will be understood that other consensus protocols that use different approaches of determining a quorum may also be used with the current subject matter.

Figure 4C:
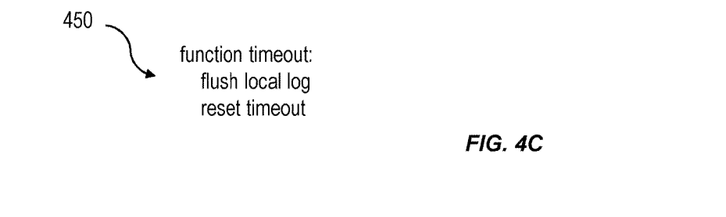

The pseudo-code 450 of FIG. 4C illustrates flushing of a buffer (at any node) on a timeout.

In some optional variations of the current subject matter, use of a commit index for log compaction (i.e., log entries with an index less than the commit index can be garbage-collected), as is typical under the RAFT protocol, can be advantageously omitted in conjunction with use of a flexible durability approach as described herein. Such entries may be still not yet written to secondary storage in a quorum of the nodes. As such, a global durable index is desirably used for log compaction.

Figure 5:
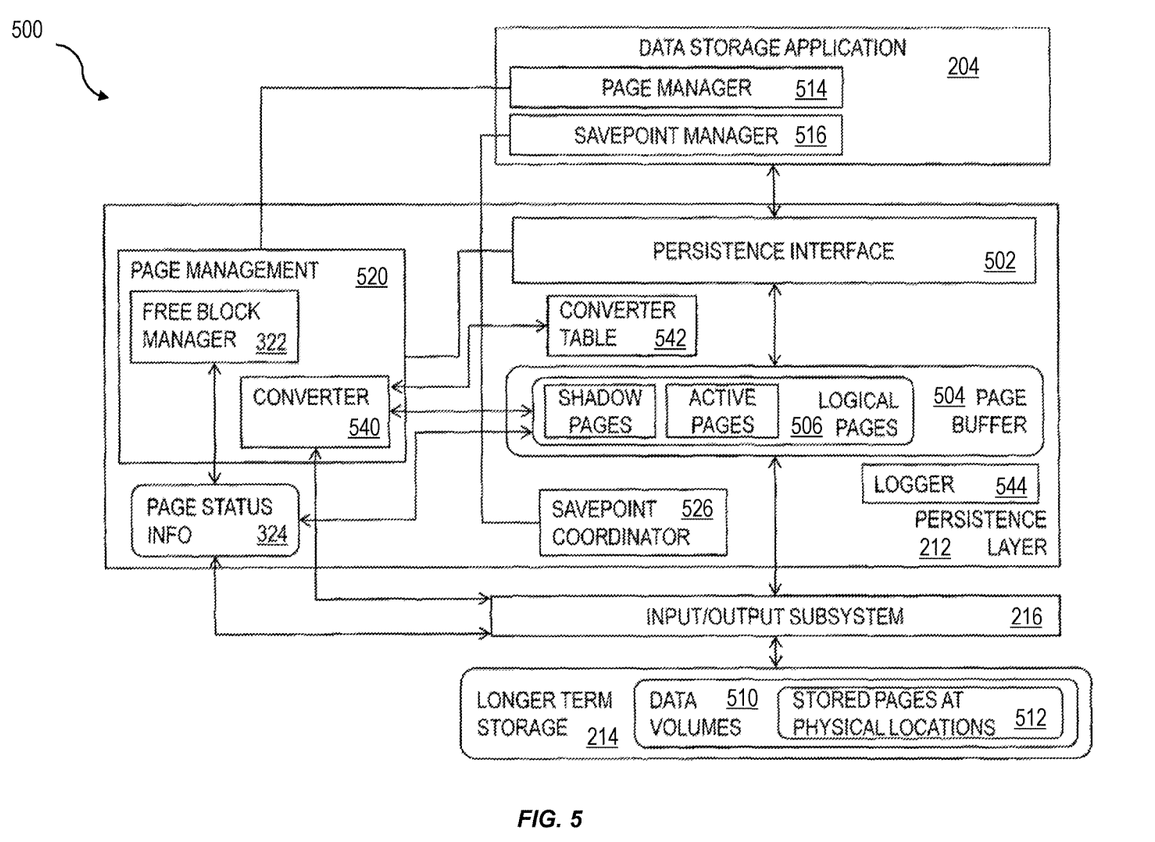
FIG. 5 shows a diagram illustrating aspects of a computing architecture having one or more features consistent with implementations of the current subject matter.

FIG. 5 shows a diagram illustrating features of a software architecture 500 with which one or more features of the current subject matter can be implemented. A data storage application 204, which can be implemented in one or more of hardware and software, can include one or more of a database application, a network-attached storage system, or the like. According to at least some implementations of the current subject matter, such a data storage application 204 can include or otherwise interface with a persistence layer 212 or other type of memory buffer, for example via a persistence interface 502. A page buffer 504 within the persistence layer 212 can store one or more logical pages 506, and optionally can include shadow pages, active pages, and the like. The logical pages 506 retained in the persistence layer 212 can be written to a secondary storage (e.g. a longer term storage, etc.) 214 via an input/output subsystem 216, which can be a software module, a sub-system implemented in one or more of software and hardware, or the like. The secondary storage 214 can include one or more data volumes 510 where stored pages 512 are allocated at physical memory blocks.

In some implementations, the data storage application 204 can include or be otherwise in communication with a page manager 514 and/or a savepoint manager 516. The page manager 514 can communicate with a page management module 520 at the persistence layer 212 that can include a free block manager 522 that monitors page status information 524, for example the status of physical pages within the secondary storage 214 and logical pages in the persistence layer 212 (and optionally in the page buffer 504). The savepoint manager 516 can communicate with a savepoint coordinator 526 at the persistence layer 204 to handle savepoints, which are used to create a consistent persistent state of the database for restart after a possible crash.

In some implementations of a data storage application 204, the page management module of the persistence layer 212 can implement shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 214. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 214, the storage page to be loaded can be looked up from the one or more converter tables 542 using the converter 540. When a logical page is written to storage 214 the first time after a savepoint, a new free physical page is assigned to the logical page. The free block manager 522 marks the new physical page as "used" and the new mapping is stored in the one or more converter tables 542.

The persistence layer 212 can ensure that changes made in the data storage application 204 are durable according to the designated durability option for a given log write request and that the data storage application 204 can be restored to a most recent committed state after a restart. Writing data to the secondary storage 214 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 stores the changes made to the data of the data storage application 204 in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk (e.g. to secondary or persistent storage) is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries can contain a log sequence number, the type of the log entry and (optionally) the identifier of the transaction. Depending on the operation type, additional information can be logged by the logger 544. For an entry of type "update," for example, this would be the identification of the affected record and the after image of the modified data.

When the data application 204 is restarted, the log entries need to be processed. To speed up this process, the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk when the corresponding transaction is finished (committed or aborted) for an "immediate" durability mode. To guarantee that the committed changes are not lost, the commit operation is not successfully finished before the corresponding log entries are flushed to disk. Writing log queue entries to disk can also be triggered by other events, for example when log queue pages are full or when a savepoint is performed. Consistent with implementations of the current subject matter, and as described above, a delayed durability mode can include starting the commit process, but not waiting for completion of the commit process. A relaxed durability mode can include proceeding without waiting even for confirmation that the commit process has begun.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Further details regarding a logger 544 utilizing log partitions can be found in co-owned U.S. Pat. No. 9,092,475, the contents of which are hereby fully incorporated by reference. In another implementation, for an immediate durability mode, the logger 544 can ensure I/O completion callback ordering in a multiple-partition log such that, even if a commit log record is written to a different partition, the confirmation of the commit is sent to the application only after all data of the transaction has been persisted by the logger 544 to the log in all log partitions affected.

Figure 6:
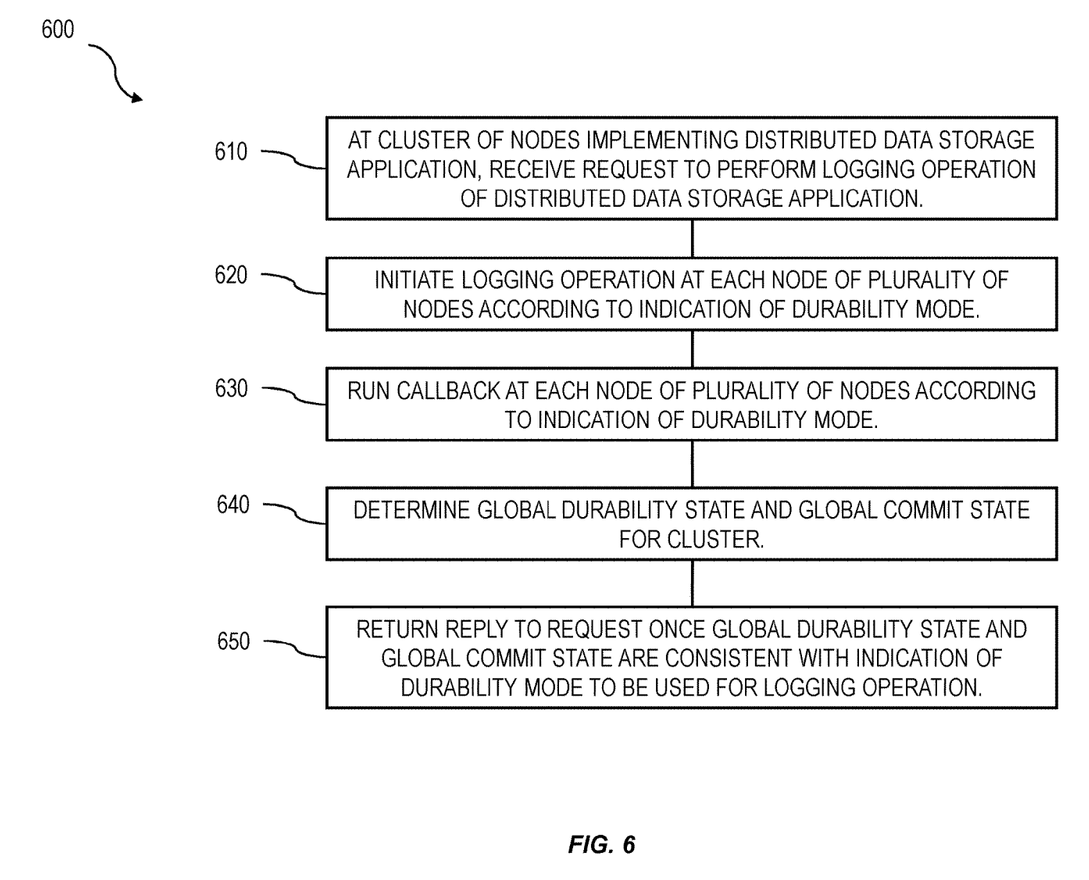
FIG. 6 shows a process flow diagram illustrating aspects of a method having one or more features consistent with implementations of the current subject matter.

FIG. 6 shows a process flow chart 600 illustrating features that can be included in a method consistent with implementations of the current subject matter. At 610, a request is received at a cluster of nodes implementing a data storage application. The cluster of nodes includes a plurality of nodes (i.e. networked computing systems that each include at least one programmable processor. The logging operation includes writing of data to secondary storages of the nodes in a manner governed by a consensus protocol. The request includes an indication of a durability mode for the logging operation. At 620, the logging operation is initiated by each node of the plurality of nodes according to the indication of the durability mode. At 630, a completion callback is run at each node of the plurality of nodes, also according to the indication of the durability mode. A global durability state and a global commit state can be determined (e.g. at the leader node of the cluster) for the cluster at 640. At 650, a reply to the request is returned (e.g. to a client machine that made the request) at an earliest possible time based on the durability mode specified for the logging operation. For example, a reply can be returned to a client machine making the request as soon as durability requirements are satisfied by the cluster as reflected by the determined global durability state and the global commit state. This determination can be based on the durability mode specified in the request, which can be internally handled by asynchronous callbacks at the nodes of the cluster.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, at a plurality of nodes implementing a distributed data storage application, a request to perform a logging operation of the distributed data storage application, the logging operation comprising writing of data to a secondary storage of each of the nodes of the plurality of nodes, the request comprising an indication of a durability mode to use for the logging operation, the indication of the durability mode selectable from a set comprising an immediate durability mode, a delayed durability mode, a relaxed durability mode, a replicated delayed durability mode, and a replicated relaxed durability mode;
initiating the logging operation at each node of the plurality of nodes according to the indication of the durability mode;
running a completion callback at each node of the plurality of nodes according to the indication of the durability mode;
determining a global durability state and a global commit state for the plurality of nodes, the determining comprising establishing a consensus among the plurality of nodes regarding whether a quorum of the plurality of nodes achieved a durability state according to the indication of the durability mode; and
returning a reply to the request once the global durability state and the global commit state are consistent with the indication of the durability mode to be used for the logging operation.

2. The computer-implemented method as in claim 1, wherein, when the indication is for the immediate durability mode, the initiating comprises each node of the plurality of nodes immediately writing a log buffer containing data to the secondary storage of that node and running the completion callback as soon as the writing is completed, and wherein the returning of the reply comprises waiting until the global durability index and the global commit index reflect that a quorum of the nodes have replied to the completion callback.

3. The computer-implemented method as in claim 1, wherein, when the indication is for the replicated delayed durability mode, the initiating comprises each node of the plurality of nodes immediately writing a log buffer containing data to the secondary storage of that node, and running the completion callback as soon as data are written to a log buffer but not yet to a secondary storage of that node, and wherein the returning of the reply comprises waiting until the global durability index and the global commit index reflect that a quorum of the nodes have written to the log buffer.

4. The computer-implemented method as in claim 1, wherein, when the indication is for the replicated relaxed durability mode, the initiating comprises each node of the plurality of nodes not immediately writing a log buffer containing data to the secondary storage of that node and running the completion callback immediately, and wherein the returning of the reply comprises waiting until the global durability index and the global commit index reflect that a quorum of the nodes commenced writing to the log buffer.

5. The computer-implemented method as in claim 1, wherein, when the indication is for the delayed durability mode, the initiating comprises each node of the plurality of nodes immediately writing a log buffer containing data to the secondary storage of that node, and running the completion callback as soon as data are written to the log buffer but not yet to the secondary storage of that node, and wherein the returning of the reply comprises waiting only until the data are written to the log buffer on a leader node of the plurality of nodes.

6. The computer-implemented method as in claim 1, wherein, when the indication is for the relaxed durability mode, the initiating comprises each node of the plurality of nodes not immediately writing a log buffer containing data to the secondary storage of that node and running the completion callback immediately, and wherein the returning of the reply comprises waiting until the data is written to a log buffer on a leader node of the plurality of nodes only.

7. The computer implemented method as in claim 1, wherein the request further comprises a destination of the data to be logged and a type of callback requested.

8. The computer implemented method as in claim 1, wherein the quorum of the plurality of nodes comprises a majority of the plurality of nodes.

9. A system comprising:
a plurality of nodes implementing a distributed data storage application, each node comprising:
at least one data processor; and
at least one memory storing instructions which, when executed by the at least one data processor, result in operations comprising:
receiving a request to perform a logging operation of the distributed data storage application, the logging operation comprising writing of data to a secondary storage of each of the nodes of the plurality of nodes, the request comprising an indication of a durability mode to use for the logging operation, the indication of the durability mode selectable from a set comprising an immediate durability mode, a delayed durability mode, a relaxed durability mode, a replicated delayed durability mode, and a replicated relaxed durability mode;
initiating the logging operation at each node of the plurality of nodes according to the indication of the durability mode;
running a completion callback at each node of the plurality of nodes according to the indication of the durability mode;
determining a global durability state and a global commit state for the plurality of nodes, the determining comprising establishing a consensus among the plurality of nodes regarding whether a quorum of the plurality of nodes achieved a durability state according to the indication of the durability mode; and
returning a reply to the request once the global durability state and the global commit state are consistent with the indication of the durability mode to be used for the logging operation.

10. The system as in claim 9, wherein, when the indication is for the immediate durability mode, the initiating comprises each node of the plurality of nodes immediately writing a log buffer containing data to the secondary storage of that node and running the completion callback as soon as the writing is completed, and wherein the returning of the reply comprises waiting until the global durability index and the global commit index reflect that a quorum of the nodes have replied to the completion callback.

11. The system as in claim 9, wherein, when the indication is for the replicated delayed durability mode, the initiating comprises each node of the plurality of nodes immediately writing a log buffer containing data to the secondary storage of that node, and running the completion callback as soon as data are written to a log buffer but not yet to a secondary storage of that node, and wherein the returning of the reply comprises waiting until the global durability index and the global commit index reflect that a quorum of the nodes have written to the log buffer.

12. The system as in claim 9, wherein, when the indication is for the relaxed durability mode, the initiating comprises each node of the plurality of nodes not immediately writing a log buffer containing data to the secondary storage and running the completion callback immediately, and wherein the returning of the reply comprises waiting until the global durability index and the global commit index reflect that a quorum of the nodes commenced writing to the log buffer.

13. The system as in claim 9, wherein, when the indication is for the delayed durability mode, the initiating comprises each node of the plurality of nodes immediately writing a log buffer containing data to the secondary storage of that node, and running the completion callback as soon as data are written to the log buffer but not yet to the secondary storage of that node, and wherein the returning of the reply comprises waiting only until the data are written to the log buffer on a leader node of the plurality of nodes.

14. The system as in claim 9, wherein, when the indication is for the relaxed durability mode, the initiating comprises each node of the plurality of nodes not immediately writing a log buffer containing data to the secondary storage of that node and running the completion callback immediately, and wherein the returning of the reply comprises waiting until the data is written to a log buffer on a leader node of the plurality of nodes only.

15. A computer program product comprising a non-transitory machine-readable medium storing instructions that, when executed by at least one programmable processor, cause the at least one programmable processor to perform operations comprising:
receiving, at a cluster of nodes implementing a distributed data storage application, a request to perform a logging operation of the distributed data storage application, the logging operation comprising writing of data to a secondary storage of each of the nodes of the plurality of nodes, the request comprising an indication of a durability mode to use for the logging operation, the indication of the durability mode selectable from a set comprising an immediate durability mode, a delayed durability mode, a relaxed durability mode, a replicated delayed durability mode, and a replicated relaxed durability mode;
initiating the logging operation at each node of the plurality of nodes according to the indication of the durability mode;
running a completion callback at each node of the plurality of nodes according to the indication of the durability mode;
determining a global durability state and a global commit state for the plurality of nodes, the determining comprising establishing a consensus among the plurality of nodes regarding whether a quorum of the plurality of nodes achieved a durability state according to the indication of the durability mode; and
returning a reply to the request once the global durability state and the global commit state are consistent with the indication of the durability mode to be used for the logging operation.

16. The computer program product as in claim 15, wherein, when the indication is for the immediate durability mode, the initiating comprises each node of the plurality of nodes immediately writing a log buffer containing data to the secondary storage of that node and running the completion callback as soon as the writing is completed, and wherein the returning of the reply comprises waiting until the global durability index and the global commit index reflect that a quorum of the nodes have replied to the completion callback.

17. The computer program product as in claim 15, wherein, when the indication is for the replicated delayed durability mode, the initiating comprises each node of the plurality of nodes immediately writing a log buffer containing data to the secondary storage of that node, and running the completion callback as soon as data are written to a log buffer but not yet to a secondary storage of that node, and wherein the returning of the reply comprises waiting until the global durability index and the global commit index reflect that a quorum of the nodes have written to the log buffer.

18. The computer program product as in claim 15, wherein, when the indication is for the relaxed durability mode, the initiating comprises each node of the plurality of nodes not immediately writing a log buffer containing data to the secondary storage and running the completion callback immediately, and wherein the returning of the reply comprises waiting until the global durability index and the global commit index reflect that a quorum of the nodes commenced writing to the log buffer.

19. The computer program product as in claim 15, wherein, when the indication is for the delayed durability mode, the initiating comprises each node of the plurality of nodes immediately writing a log buffer containing data to the secondary storage of that node, and running the completion callback as soon as data are written to the log buffer but not yet to the secondary storage of that node, and wherein the returning of the reply comprises waiting only until the data are written to the log buffer on a leader node of the plurality of nodes.

20. The computer program product as in claim 15, wherein, when the indication is for the relaxed durability mode, the initiating comprises each node of the plurality of nodes not immediately writing a log buffer containing data to the secondary storage of that node and running the completion callback immediately, and wherein the returning of the reply comprises waiting until the data is written to a log buffer on a leader node of the plurality of nodes only.

* * * * *